(12) United States Patent
Park et al.

(10) Patent No.: US 9,817,507 B2
(45) Date of Patent: Nov. 14, 2017

(54) METHOD AND APPARATUS FOR DETECTING MOVEMENT OF OBJECT BASED ON EVENT

(71) Applicant: SAMSUNG ELECTRONICS CO., LTD., Suwon-si (KR)

(72) Inventors: Keun Joo Park, Seoul (KR); Kyoobin Lee, Seoul (KR); Jun Haeng Lee, Hwaseong-si (KR); Eric Hyunsurk Ryu, Hwaseong-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 163 days.

(21) Appl. No.: 14/705,091

(22) Filed: May 6, 2015

(65) Prior Publication Data
US 2016/0139795 A1 May 19, 2016

(30) Foreign Application Priority Data

Nov. 17, 2014 (KR) .................. 10-2014-0159926

(51) Int. Cl.
*G06F 3/042* (2006.01)
*G06F 3/041* (2006.01)

(52) U.S. Cl.
CPC ............ *G06F 3/0416* (2013.01); *G06F 3/042* (2013.01); *G06F 2203/04808* (2013.01)

(58) Field of Classification Search
CPC .................. G06F 3/0416; G06F 3/042; G06F 2203/04808

USPC ........................................................ 345/175
See application file for complete search history.

(56) References Cited

U.S. PATENT DOCUMENTS

| | | | |
|---|---|---|---|
| 6,693,676 B2 | 2/2004 | Yamaguchi et al. | |
| 7,728,269 B2 | 6/2010 | Lichtsteiner et al. | |
| 8,638,342 B2 | 1/2014 | Cote et al. | |
| 8,698,092 B2 | 4/2014 | Lee et al. | |
| 2003/0189655 A1 | 10/2003 | Lim et al. | |
| 2006/0008001 A1* | 1/2006 | Lee ................... | H04N 19/44 375/240.03 |
| 2006/0177026 A1* | 8/2006 | Suetsugu ............. | H04J 3/0685 379/90.01 |
| 2006/0179360 A1* | 8/2006 | Nakamura ........... | G06F 21/645 714/47.1 |
| 2007/0140580 A1* | 6/2007 | Heath ................. | H04N 19/39 382/260 |
| 2012/0061568 A1* | 3/2012 | Lee ................... | G06K 9/00335 250/338.1 |
| 2012/0257789 A1 | 10/2012 | Lee et al. | |
| 2013/0251282 A1 | 9/2013 | Min | |
| 2013/0335595 A1* | 12/2013 | Lee ................... | H04N 5/23229 348/231.5 |

FOREIGN PATENT DOCUMENTS

| | | |
|---|---|---|
| JP | 2008193142 A | 8/2008 |
| JP | 4523626 B2 | 6/2010 |

(Continued)

*Primary Examiner* — Adam R Giesy
*Assistant Examiner* — Chineyere Wills-Burns
(74) *Attorney, Agent, or Firm* — Sughrue Mion, PLLC

(57) ABSTRACT

A method and apparatus for detecting a movement of an object based on an event are provided. The apparatus may detect a movement of an object, for example, based on time difference information of a pixel corresponding to an event detected using an event-based vision sensor.

14 Claims, 21 Drawing Sheets

(56) References Cited

FOREIGN PATENT DOCUMENTS

| | | | |
|---|---|---|---|
| KR | 1020100035909 | A | 4/2010 |
| KR | 1020130062200 | A | 6/2013 |
| KR | 1020130096073 | A | 8/2013 |
| KR | 1020130109817 | A | 8/2013 |
| KR | 1020140028064 | A | 3/2014 |

\* cited by examiner

METHOD AND APPARATUS FOR DETECTING MOVEMENT OF OBJECT BASED ON EVENT

CROSS-REFERENCE TO RELATED APPLICATION

This application claims priority from Korean Patent Application No. 10-2014-0159926, filed on Nov. 17, 2014, in the Korean Intellectual Property Office, the entire disclosure of which is incorporated herein by reference in its entirety.

BACKGROUND

1. Field

Methods and apparatuses consistent with exemplary embodiments relate to detecting a movement of an object based on an event.

2. Description of Related Art

To control mobile devices, and the like, an interface technology for controlling a device by recognizing a user's motion is required. To increase accuracy of motion recognition based on a depth image, high-quality three-dimensional (3D) information with a high resolution and a high accuracy may need to be acquired.

For example, a depth image may be acquired using an active acquisition scheme and a passive acquisition scheme. The active acquisition scheme may directly acquire depth information using a physical sensor device, for example, an infrared sensor, or a depth camera, whereas the passive acquisition scheme may calculate depth information from an image obtained using at least two cameras.

However, accuracy of depth information of a depth image may not be guaranteed at all times. In addition, due to a high complexity required to compute depth information, a significant amount of computation and computation time may be required to recognize a motion of a user.

SUMMARY

Exemplary embodiments may address at least the above problems and/or disadvantages and other disadvantages not described above. Also, exemplary embodiments are not required to overcome the disadvantages described above, and an exemplary embodiment may not overcome any of the problems described above.

According to an aspect of an exemplary embodiment, there is provided a method of detecting a movement including detecting an event, which is associated with the movement of an object and occurs in a plurality of pixels in image data and outputting at least one event signal based on the detected event, storing time information respectively corresponding to each of the pixels in which the event occurs, in response to the output of the at least one event signal, and extracting an event signal including time information corresponding to a predetermined time range from among the at least one event signal.

The detecting the event may include identifying the event signal corresponding to at least a portion of the object from among the at least one event signal.

The detecting the event may include selecting the event signal corresponding to another predetermined event from among the at least one event signal.

The method may further include calculating time difference information of each of the pixels, based on time information of at least one neighboring pixel surrounding the respective pixel.

The method may further include determining whether the time difference information for each of the pixels corresponds to a predetermined threshold time difference range and selecting each pixel from among the pixels, in response to the time difference information being determined to correspond to the predetermined threshold time difference range.

The calculating the time difference information may include calculating a time difference between time information of the respective pixel and time information of the at least one neighboring pixel.

The calculating the time difference information may include storing a sum of the calculated time differences as the time difference information.

The method may further include restoring a pixel associated with the movement of the object, based on an event signal corresponding to each of at least one neighboring pixel surrounding the respective pixel.

The method may further include performing filtering of the pixel, based on an event signal corresponding to each of at least one neighboring pixel surrounding the respective pixel.

The extracting the event signal may include determining the predetermined time range, based on time information corresponding to a last event signal in a predetermined time window, or based on average time information of the at least one event signal in the predetermined time window.

The method may further include adjusting the time range based on the calculated time difference information.

According to yet another aspect of an exemplary embodiment, there is provided an apparatus for detecting a movement including a sensor configured to detect an event, which is associated with the movement of an object and occurs in each of a plurality of pixels in image data and output at least one event signal based on the detected event, and a storage configured to store time information corresponding to each of the pixels in which the event occurs, a processor configured to extract an event signal including time information corresponding to a predetermined time range from among the at least one event signal.

The processor may be configured to identify an event signal corresponding to at least a portion of the object from among the at least one event signal.

The processor may be configured to select another event signal corresponding to a predetermined event from among the at least one event signal.

The processor may be configured to calculate time difference information of each of the pixels based on time information of at least one neighboring pixel surrounding the respective pixel.

The processor may be configured to determine whether the time difference information for each of the pixels corresponds to a predetermined threshold time difference range and select each pixel from among the pixels in response to the time difference information being determined to correspond to the predetermined threshold time difference range.

The processor may be configured to calculate a difference between time information of the respective pixel and time information of the at least one neighboring pixel to obtain the time difference information.

The storage may be configured to store a sum of the calculated time differences as the time difference information.

The processor may be configured to restore a pixel associated with the movement of the object, based on an event signal corresponding to each of at least one neighboring pixel surrounding the respective pixel.

The processor may be configured to perform filtering of the respective pixel, based on an event signal corresponding to each of at least one neighboring pixel surrounding the respective pixel.

BRIEF DESCRIPTION OF THE DRAWINGS

The above and other aspects of exemplary embodiments will become apparent and more readily appreciated from the following detailed description of certain exemplary embodiments, taken in conjunction with the accompanying drawings of which.

DETAILED DESCRIPTION OF EXEMPLARY EMBODIMENTS

Figure 1:
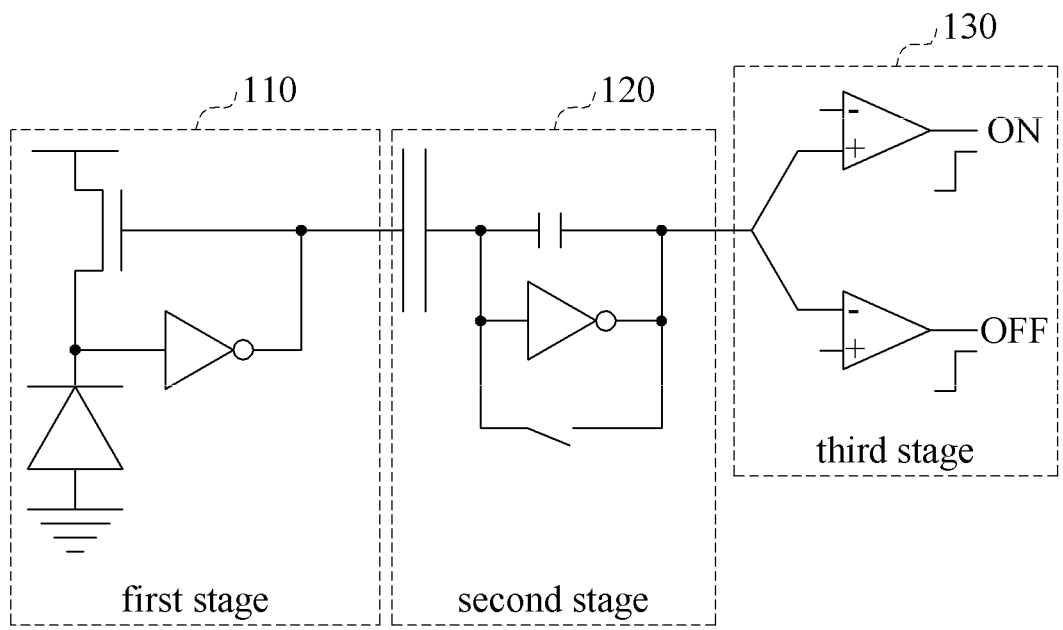
FIG. 1 is a diagram illustrating a configuration of an event-based sensor according to an exemplary embodiment.

Reference will now be made in detail to exemplary embodiments, examples of which are illustrated in the accompanying drawings, wherein like reference numerals refer to the like elements throughout. Exemplary embodiments are described below in order to explain the present disclosure by referring to the figures.

The following detailed description of exemplary embodiments is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing steps and/or operations described is exemplary embodiments, however, the sequence of and/or operations is not limited to that set forth herein and may be changed as is known in the art, with the exception of steps and/or operations necessarily occurring in a particular order. In addition, respective descriptions of well-known functions and constructions may be omitted for increased clarity and conciseness.

Throughout the drawings and the detailed description of exemplary embodiments, unless otherwise described, the same drawing reference numerals will be understood to refer to analogous elements, features, and structures. The relative size and depiction of these elements may be exaggerated for clarity, illustration, and convenience.

FIG. 1 is a diagram illustrating a configuration of an event-based sensor according to an exemplary embodiment.

Referring to FIG. 1, the event-based sensor 100 may include three stages, for example, a first stage 110, a second stage 120, and a third stage 130.

In the first stage 110, an electronic signal may be output. The electronic signal may be proportional to an intensity of light incident on the event-based sensor 100. For example, the first stage 110 may generate a voltage or a current that is proportional to the intensity of the light. In the first stage 110 of FIG. 1, a current may be generated.

In the second stage 120, a signal to amplify a change in light may be output. For example, in the second stage 120, a direct current (DC) component of the electronic signal output from the first stage 110 may be removed using a capacitor. In the second stage 120, a variation in the electronic signal output from the first stage 110 may be amplified.

In the third stage 130, an ON event signal, or an OFF event signal may be output. For example, when the variation in the electronic signal amplified in the second stage 120 is greater than a threshold variation, the ON event signal may be output from the third stage 130. When the variation in the electronic signal is less than the threshold variation, the OFF event signal may be output from the third stage 130.

In an exemplary embodiment, an event may correspond to a user's input, and may include, for example, an event in which brightness is changed, an event in which sound is changed, an event in which a touch is changed, and the like. The event may be detected and output using various event-based sensors. For example, the event may be detected and output using an event-based vision sensor configured to capture an object.

The event-based vision sensor may asynchronously output an event signal by detecting a change in brightness of incident light. For example, when an event in which light is brightened in a predetermined pixel is detected, the event-based vision sensor may output an ON event corresponding to the predetermined pixel. When an event in which light is darkened in a predetermined pixel is detected, the event-based vision sensor may output an OFF event corresponding to the predetermined pixel.

Unlike a frame-based vision sensor, the event-based vision sensor may output only pixel data of a portion with a change in light, instead of scanning an output of a photodiode of each pixel in a unit of a frame. A brightness of light incident on a vision sensor may be changed based on a movement of an object. For example, when a light source is substantially fixed over time, and when an object does not self-emit light, light emitted from the light source and reflected by the object may be incident on the vision sensor. Light reflected by a stationary object is substantially unchanged and accordingly, brightness of light incident on the event-based vision sensor may be unchanged. In contrast, light reflected by a moving object is changed based on a movement of the object and accordingly, the brightness of the light incident on the event-based vision sensor may be changed.

An event signal output in response to a movement of an object may be asynchronously generated information, and may be similar to an optic nerve signal transferred from a retina to a brain. For example, the event signal may be generated when a moving object, instead of a stationary object, is detected.

In an exemplary embodiment, when an amount of light in a pixel is increased by at least a predetermined amount, the event-based vision sensor may output a value of "1," an address of the pixel, and a time in which the light is changed. In another exemplary embodiment, when an amount of light in another pixel is reduced by at least a predetermined amount, the event-based vision sensor may output a value of "−1," an address of the other pixel, and a time in which the light is changed. An address of a pixel may be matched to a number, a position, and an index of the pixel, in an exemplary embodiment.

Unlike the event-based vision sensor, an event-based auditory sensor may detect a change in sound, and may output the change in the sound as an event, according to an exemplary embodiment. The event-based auditory sensor may asynchronously output an event signal by detecting a change in received sound. For example, when an event in which a sound volume increases in a predetermined frequency band is detected, the event-based auditory sensor may output an ON event corresponding to the predetermined frequency band. When an event in which the volume of a sound decreases in a predetermined frequency band is detected, the event-based auditory sensor may output an OFF event corresponding to the predetermined frequency band.

An event-based touch sensor may detect a change in a touch (sensory input), and may output the change in the touch as an event, according to an exemplary embodiment. The event-based touch sensor may asynchronously output an event signal by detecting a change in an applied touch. For example, when a touch input event is detected from a predetermined position, the event-based touch sensor may output an ON event corresponding to the predetermined position. When a touch-off event is detected from a predetermined position, the event-based touch sensor may output an OFF event corresponding to the predetermined position.

In an exemplary embodiment, the event-based sensor or the event-based vision sensor may be referred to as an "event sensor." The above-described event sensor may utilize only time information and an address of a pixel in which light is changed and accordingly, an amount of information to be processed may be greatly reduced, in comparison to a typical image camera.

Figure 2:
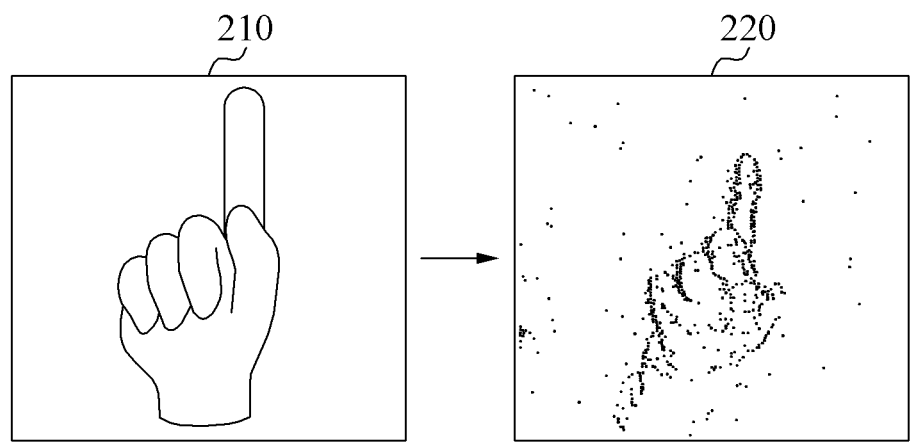
FIG. 2 is a view illustrating an example of an event frame according to an exemplary embodiment.

FIG. 2 is a view illustrating an event frame according to an exemplary embodiment.

In related art, to recognize a user's hand movement, a feature may be extracted from a measured image, and a similar hand shape may be retrieved through a comparison to a template corresponding to a hand shape. However, the above scheme may require a large amount of computation to extract the feature and to calculate a probability distribution for the comparison to the template.

The event sensor described above with reference to FIG. 1 may asynchronously operate and accordingly, may individually detect an occurrence of an event in each pixel, according to an exemplary embodiment. Hereinafter, in an exemplary embodiment, the event frame 220 may refer to a set of pixels corresponding to an event occurring during a predetermined time window. The predetermined time window may be, for example, a unit to identify a time in which an event occurs.

For example, when an event sensor detects a hand movement 210, pixels corresponding to an event occurring during a predetermined time window may be represented as dots in the event frame 220, as shown in FIG. 2 according to an exemplary embodiment. The event frame 220 may visually represent the pixels corresponding to an event occurring during a predetermined time window.

However, the event frame 220 may not be limited thereto and is provided by way of an example only, and may include information associated with an event occurring in each of the pixels. The information associated with an event occurring in each of the pixels may include, for example, an index of each of the pixels (for example, an identification number uniquely designated to each of the pixels), time information indicating a time in which an event occurs in each of the pixels, a type of an event occurring in each of the pixels, and a location of each of the pixels.

In an exemplary embodiment, the above-described information included in the event frame 220 may be represented as an event map. The event map may include elements corresponding to a plurality of event values that may be included in an event. The elements may be matched to pixels corresponding to the event values, and may be stored in the event map. Each of the elements may include, for example, a timestamp indicating a latest time at which an event corresponding to each of the elements occurs, and a type of events (for example, "1" corresponding to an ON event, and "−1" corresponding to an OFF event).

Figure 3:
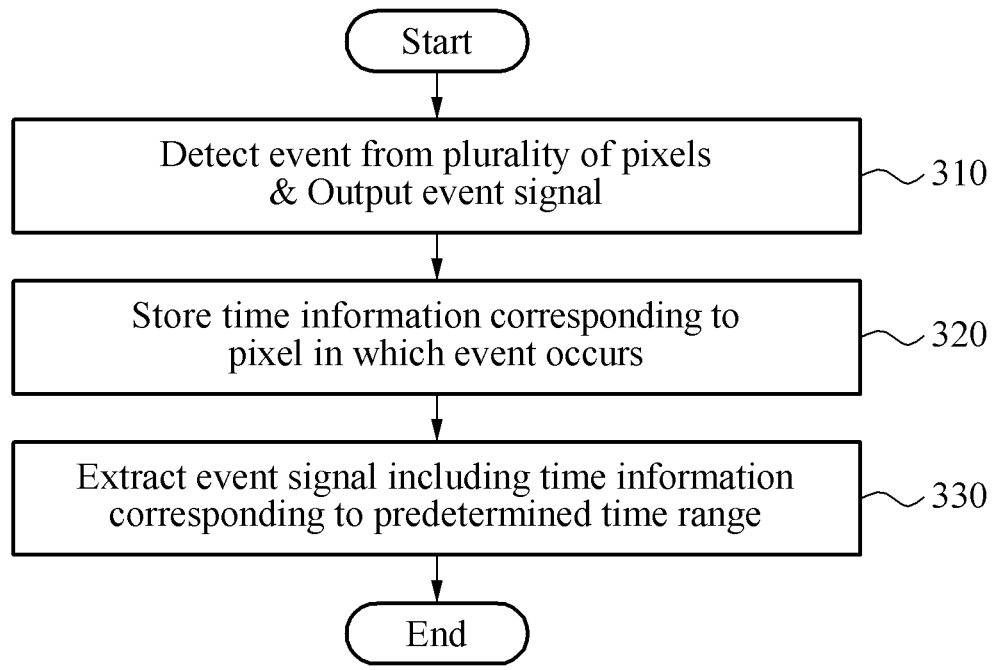
FIG. 3 is a flowchart illustrating a method of detecting a movement of an object based on an event according to an exemplary embodiment.

FIG. 3 is a flowchart illustrating a method of detecting a movement of an object based on an event according to an exemplary embodiment.

Referring to FIG. 3, in operation 310, an event sensor may detect an event from a plurality of pixels included in image data, and may output an event signal. For example, the event sensor may detect an event that is associated with a movement of an object and that occurs in each of the pixels, and may output at least one event signal. An example of an event frame, that is, a set of the at least one event signal will be further described with reference to FIG. 4, according to an exemplary embodiment.

The event may include an ON event in which brightness of a pixel increases due to the movement of the object, and an OFF event in which brightness of a pixel decreases due to the movement of the object. For example, when an ON event occurs in each of the pixels, an event signal may be "1." When an OFF event occurs, an event signal may be "−1." However, this is not provided as a limitation but by way of an example only, and the event signal may include, for example, signals to distinguish the ON event from the OFF event.

In an exemplary embodiment, the object may include, for example, a human body (for example, a hand, an arm, or a leg), a human face, an inanimate object, an animal, and the like. The movement of the object may refer to a state in which the object moves based on the event sensor. A high-speed movement of an object or a portion of the object may refer to a state in which the object or the portion of the object moves quickly.

In operation 320, a processor may store time information corresponding to a pixel in which an event occurs. For example, in response to at least one event signal being output, the processor may store time information corresponding to a pixel in which an event occurs. An event frame in which time information is stored will be described below in greater detail with reference to FIG. 7.

The time information may include information associated with a time in which an event occurs in each of the pixels. For example, the time information may include a timestamp corresponding to a time in which an event occurs in each of the pixels.

In operation 330, the processor may extract an event signal including time information corresponding to a predetermined time range. For example, the processor may determine a time range, based on time information corresponding to a last event signal in a predetermined time window, or average time information of at least one event signal in the predetermined time window. An event signal extracted based on the predetermined time range will be described in greater detail below with reference to FIG. 8.

Additionally, the processor may adjust the time range, based on calculated time difference information described in greater detail below with reference to FIG. 9. For example, when an average of time difference information of at least one event signal in the predetermined time window is greater than an average threshold time difference, e.g., when an object moves slowly, the processor may increase the time range. When the average of the time difference information is less than the average threshold time difference, e.g., when the object moves quickly, the processor may reduce the time range. However, this is not a limitation but is provided by way of an example and accordingly, the time range may be increased when the average of the time difference information is less than the average threshold time difference, or the time range may be reduced when the average of the time difference information is greater than the average threshold time difference. The average threshold time difference may be changed based on a design according to an exemplary embodiment.

By extracting an event signal including time information corresponding to a predetermined time range from an event frame, the processor may identify which portion of a moving object moves at a high speed.

For example, when a difference between a timestamp stored in an arbitrary pixel in an event frame and a timestamp stored in a pixel adjacent to the arbitrary pixel is reduced, an object may move quickly. Because timestamps may be stored for each pixel in the event sensor in response to a movement of an object, a time difference between neighboring pixels may decrease when the object moves quickly.

Figure 4:
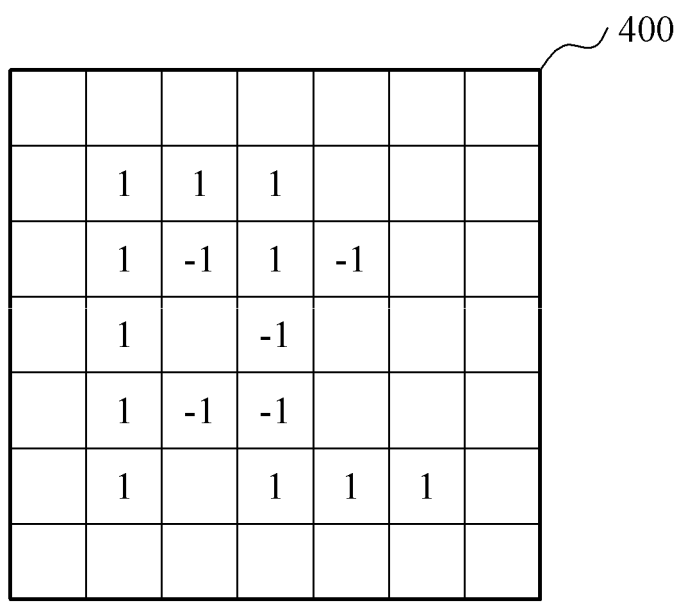
FIG. 4 is a view illustrating an event frame representing an output event signal according to an exemplary embodiment.

FIG. 4 is a view illustrating an event frame representing an output event signal according to an exemplary embodiment.

As described above, for example in operation 310 of FIG. 3, the event sensor may detect an event from the pixels, and may output an event signal. For example, the processor may store the output event signal in the event frame 400 with a shape of an event map, as shown in FIG. 4 according to an exemplary embodiment.

In the event frame 400, "1" may be stored as a value of an event signal corresponding to a pixel in which an ON event detected by the event sensor occurs, and "−1" may be stored as a value of an event signal corresponding to a pixel in which an OFF event detected by the event sensor occurs. Each of the event signals may be matched to a location or an index of a pixel in which a corresponding event occurs, and may be stored.

Figure 5:
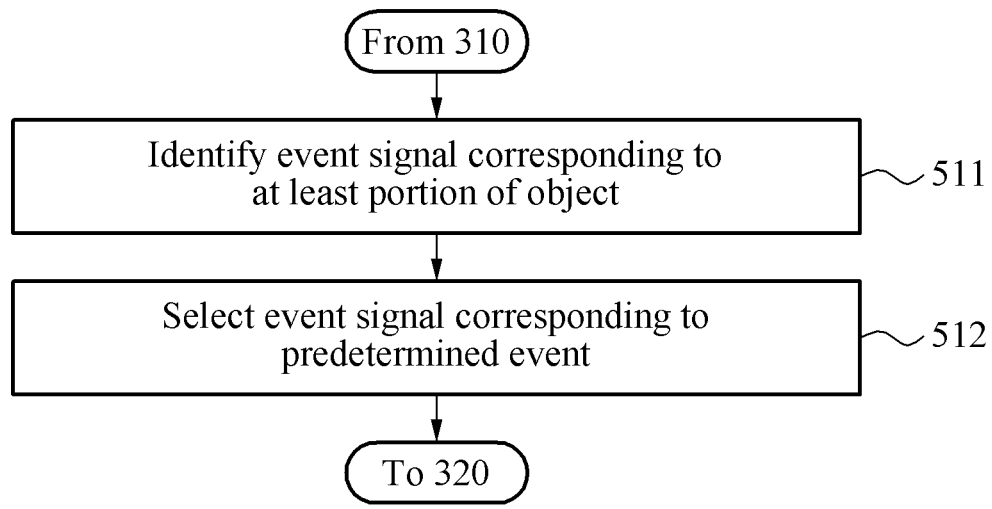
FIG. 5 is a flowchart illustrating an operation of selecting at least one event signal from among a plurality of event signals according to an exemplary embodiment.

FIG. 5 is a flowchart illustrating an operation of selecting at least one event signal from among a plurality of event signals according to an exemplary embodiment.

Referring to FIG. 5, in operation 511, the processor may identify an event signal corresponding to at least a portion of the object. For example, the processor may identify an event signal corresponding to at least a portion of the object from among at least one event signal.

For example, when an object is assumed to be a human body (for example, an arm), the processor may extract a part of the body (for example, a hand) from a plurality of event signals. The processor may identify an event signal corresponding to an object or a portion of the object from among event signals forming an event frame, by using a machine learning scheme, for example, a Gaussian mixture model, and the like.

In operation 512, the processor may select an event signal corresponding to a predetermined event from among at least one event signal. For example, the processor may select an event signal corresponding to a predetermined type of events as a predetermined event from among event signals forming an event frame.

The processor may select, for example, only an event signal corresponding to an ON event, or an event signal corresponding to an OFF event. Hereinafter, an event frame representing an event signal corresponding to an ON event is described with reference to FIG. 6, according to an exemplary embodiment.

Figure 6:
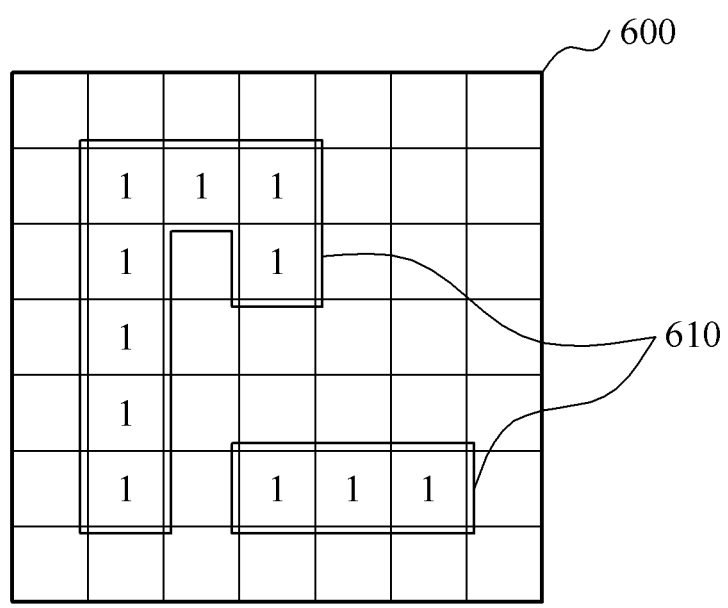
FIG. 6 is a view illustrating an event frame representing an event signal corresponding to a predetermined event according to an exemplary embodiment.

FIG. 6 is a view illustrating an event frame representing an event signal corresponding to a predetermined event according to an exemplary embodiment.

As described above, for example in operation 512 of FIG. 5, the processor may select an event signal corresponding to a predetermined event from among at least one event signal.

For example, the processor may select an event signal 610 corresponding to an ON event from the event frame 600, as shown in FIG. 6. However, this is not a limitation but is provided by way of an example and accordingly, the processor may select an event signal corresponding to an OFF event.

Figure 7:
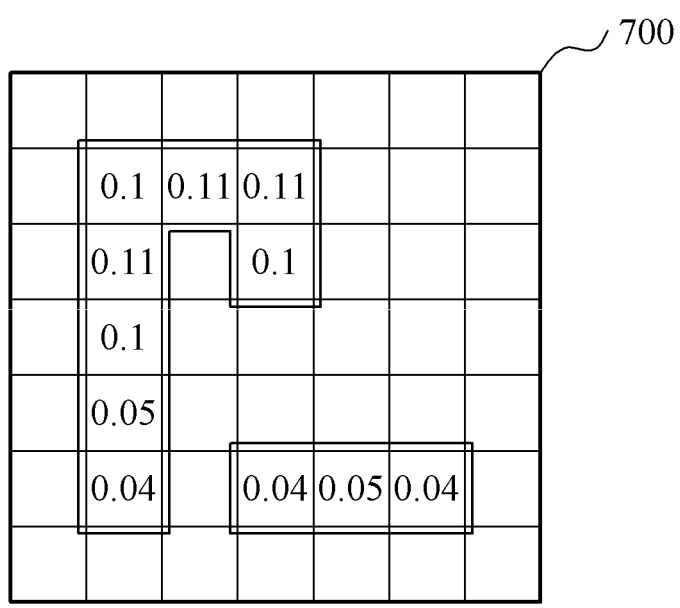
FIG. 7 is a view illustrating an event frame in which time information is stored according to an exemplary embodiment.

FIG. 7 is a view illustrating an event frame in which time information is stored according to an exemplary embodiment.

As described above, for example in operation 320 of FIG. 3, the processor may store time information corresponding to a pixel in which an event occurs. For example, when an event is received, the processor may update the event frame 700, based on the event. The event frame 700 may include elements corresponding to a plurality of event values that may be included in an event. Each of the elements may store a timestamp indicating a latest time at which an event corresponding to each of the elements occurs. Additionally, each of the elements may store a type of an event corresponding to each of the elements (for example, "1" corresponding to an ON event, or "−1" corresponding to an OFF event). The elements may correspond to pixels forming the event frame 700, respectively.

In an exemplary embodiment, the event frame 700 may include 7×7 pixels, however, this is not a limitation but is provided by way of an example only. For example, the event frame 700 may include an arbitrary number of pixels, for example, 128×128 pixels. In an exemplary embodiment, a pixel located at (i, j) may refer to a pixel located at an i-th row and j-th column. For example, latest time at which an event occurs in a pixel located at (4, 2) may be "0.1," and a latest time at which an event occurs in a pixel located at (5, 2) may be "0.05," as shown in FIG. 7.

When an event is received, the processor may update an element corresponding to an event value included in the event. The processor may update only an element corresponding to the event, instead of updating all elements. For example, the processor may detect an element corresponding to an event value in the received event from among a plurality of elements included in the event frame 700, and may update a timestamp of the detected element to a timestamp of the received event. Additionally, the processor may update a class of the detected element to a type of the received event (for example, an ON event or an OFF event).

The processor may store a time at which a new event occurs, in a microsecond (μs) or less, for each element, according to an exemplary embodiment. The timestamp may refer to a time or a sequence in which events occur in μs or less. The processor may perform image processing based on information associated with a last event occurring in each of the elements, regardless of a history of events occurring over time. The processor may provide a technology of performing image processing with a small amount of computation and a small memory capacity.

Figure 8:
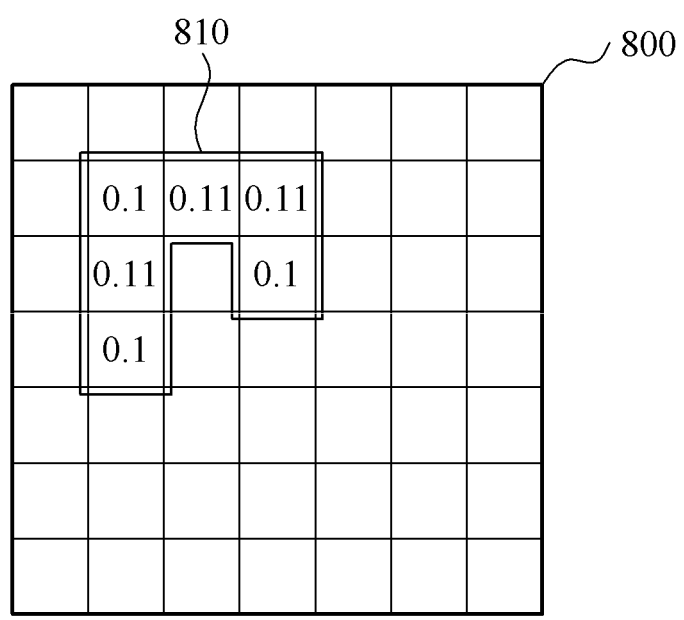
FIG. 8 is a view illustrating an event frame representing an event signal in a predetermined time range according to an exemplary embodiment.

FIG. 8 is a view illustrating an event frame representing an event signal in a predetermined time range according to an exemplary embodiment.

As described above, for example in operation 330 of FIG. 3, the processor may extract an event signal including time information corresponding to a predetermined time range. For example, the processor may extract an event signal 810 satisfying a predetermined time range, based on the stored time information of FIG. 7.

In FIG. 8, the predetermined time range may be determined based on time information corresponding to a last event signal in a predetermined time window. The predetermined time range may be set as a short time range based on the time information corresponding to the last event signal.

In the event frame 800 corresponding to a predetermined time window, a timestamp corresponding to a last event signal may be "0.11." The predetermined time range may be set as a range of "0.09" to "0.11" to have a time interval of "0.02." The processor may exclude event signals that do not belong to the predetermined time range, for example, event signals including time information of "0.04" through "0.05" from the event frame 700 of FIG. 7, and may include event signals 810 including time information of "0.1" through "0.11" in the event frame 800.

However, this is not a limitation but is provided by way of an example of the above-described predetermined time range, and the predetermined time range may be set, for example, as a predetermined interval based on last time information, or as a predetermined interval based on average time information of event signals in the event frame 800. The average time information may be, for example, an average timestamp or an average time of events corresponding to the event frame 800. Additionally, the predetermined interval based on the average time information may be, for example, a predetermined interval before and after the average time or the average timestamp.

Figure 9:
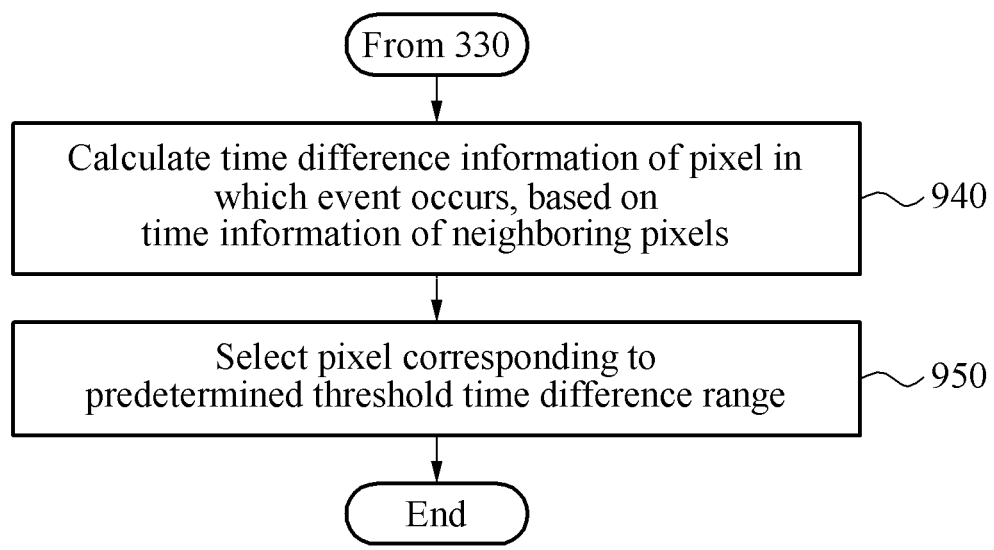
FIG. 9 is a flowchart illustrating an operation of selecting at least one pixel from among pixels in which events occur according to an exemplary embodiment.

FIG. 9 is a flowchart illustrating an operation of selecting at least one pixel from among pixels in which events occur according to an exemplary embodiment.

Referring to FIG. 9, in operation 940, the processor may calculate time difference information of a pixel in which an event occurs, based on time information of neighboring pixels. For example, the processor may calculate time difference information of a pixel in which an event occurs, based on time information of at least one neighboring pixel surrounding the pixel. Calculating of the time difference information according to an exemplary embodiment will be described in greater detail below with reference to FIGS. 10 through 14.

The time difference information may include, for example, a time difference level as a level of a moving speed of an object in the pixel.

The time difference level may be, for example, information about a degree of object movement i.e., the object moving slowly or quickly, not an actual measured speed. The time difference level may be represented as a sum of time difference information between neighboring pixels, and may indicate an increase in a speed due to a decrease in the sum of the time difference information. Accordingly, when a time difference level of a pixel (for example, a sum of time differences) decreases, a portion corresponding to the pixel in the object may move more quickly. The time difference information will be described in greater detail below with reference to FIG. 13.

In operation 950, the processor may select a pixel corresponding to a predetermined threshold time difference range. For example, in response to determining time difference information of a pixel in which an event occurs to correspond to a predetermined threshold time difference range, the processor may select the pixel.

The predetermined threshold time difference range may be set so that an event signal corresponding to a high-speed movement may be selected. For example, the predetermined threshold time difference range may be set as a range between a fastest threshold level and a slowest threshold level. The fastest threshold level may refer to a highest speed level, and correspond to a smallest time difference level. The slowest threshold level may refer to a lowest speed level, and correspond to a largest time difference level.

The predetermined threshold time difference range may be set based on at least one of an average, a minimum, and a maximum of time difference information of pixels forming an event frame. Additionally, the predetermined threshold time difference range may be set as a range between a maximum time difference of an event frame and a predetermined ratio of the maximum time difference (for example, 80%).

An example of selecting a pixel corresponding to a predetermined threshold time difference range will be described in greater detail below with reference to FIG. 14.

Figure 10:
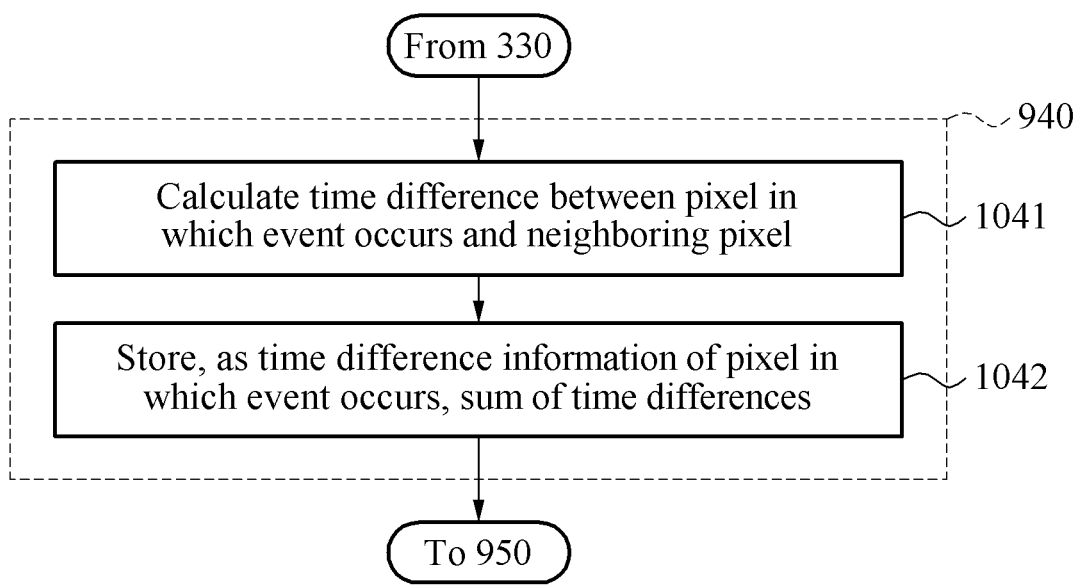
FIG. 10 is a flowchart illustrating an operation of calculating a time difference between pixels as time difference information according to an exemplary embodiment.

FIG. 10 is a flowchart illustrating an operation of calculating a time difference between pixels as time difference information according to an exemplary embodiment.

Referring to FIG. 10, in operation 1041, the processor may calculate a time difference between a pixel in which an event occurs and a neighboring pixel. For example, the processor may calculate a time difference between time information of a pixel in which an event occurs and time information of at least one neighboring pixel. Based on the time difference, filtering of a pixel corresponding to noise among pixels in which an event occurs may be performed by a first filter. The filtering performed by the first filter (hereinafter, referred to as "first filtering") will be described in greater detail below with reference to FIG. 13.

In operation 1042, the processor may store, as time difference information of the pixel in which the event occurs, a sum of time differences calculated in operation 1041. The processor may store, as the time difference information, a sum of time differences calculated by the first filter in operation 1041. The time differences calculated in operation 1041 will be described in greater detail below with reference to FIG. 14.

Figure 11:
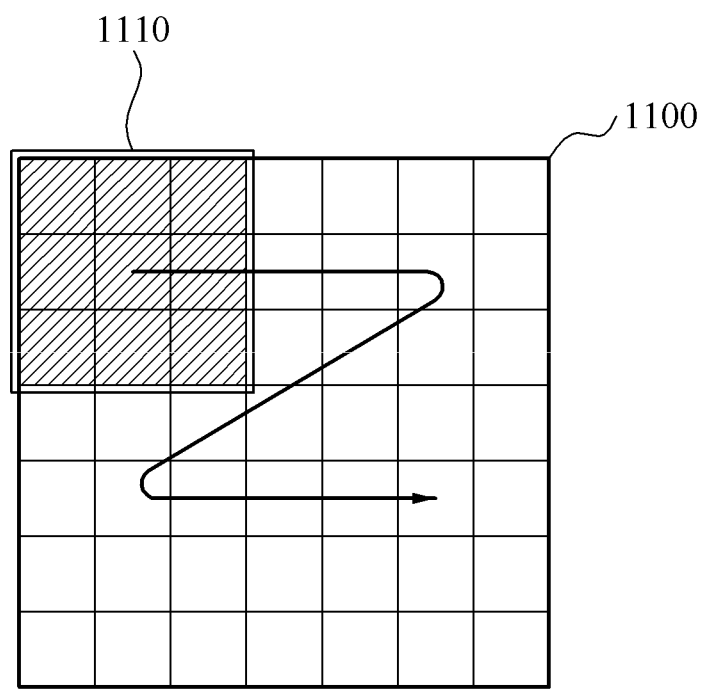
FIGS. 11 and 12 are views illustrating a shape of a filter according to exemplary embodiments.
Figure 12:
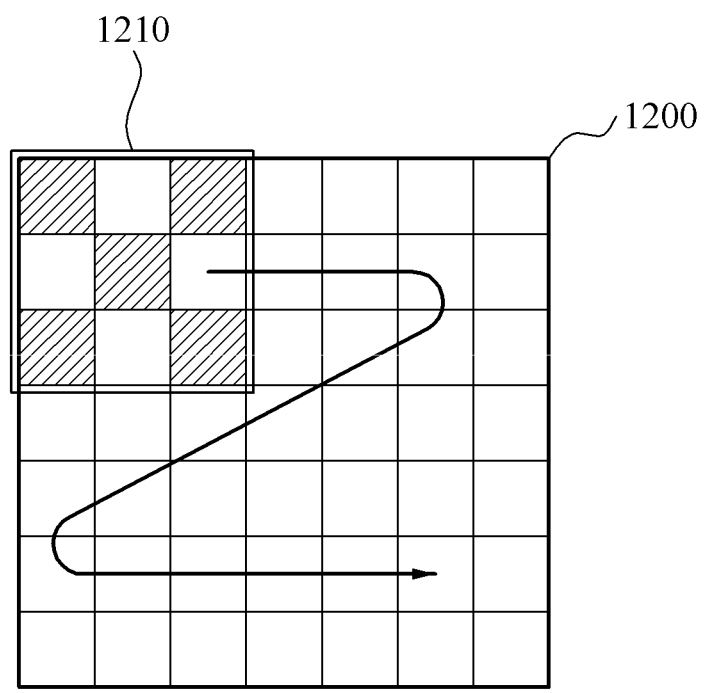

FIGS. 11 and 12 are views illustrating a shape of a filter according to exemplary embodiments.

In an exemplary embodiment, a first filter configured to perform time filtering, and a second filter configured to spatial filtering may be used. For example, the first filter may be used to calculate a time difference between pixels, and the second filter may be used to remove a noise pixel, and to restore a pixel associated with a movement of an object.

Referring to FIGS. 11 and 12, in filters 1110 and 1210, an operation may be performed between elements represented by a box illustrated with diagonal lines (shaded boxes). For example, when each of the filters 1110 and 1210 has a size of 3×3, an operation may be performed between a central element and neighboring elements in each of the filters 1110 and 1210. The filter 1110 of FIG. 11 may perform an operation between a central element and all neighboring elements surrounding the central element. The filter 1210 of FIG. 12 may perform an operation between a central element and neighboring elements located diagonally to the central element, as illustrated by the shaded boxes.

Hereinafter, FIGS. 13 and 16 will be described based on a shape of the filter 1110 of FIG. 11 that may perform, for example, an operation between elements in the filter 1110. First filtering, and filtering performed by a second filter (hereinafter, referred to as "second filtering") will be described in greater detail below with reference to FIGS. 13 and 16, respectively.

Filtering by a filter may be performed in each of event frames 1100 and 1200, in a direction indicated by an arrow of each of FIGS. 11 and 12; however, this is not a limitation but is provided by way of an example only. Accordingly, a direction in which the filtering is performed may be changed based on a design, according to an exemplary embodiment.

Filtering may be performed on each pixel. For example, filtering may be performed on pixels in each of the event frames 1100 and 1200, or on a pixel in which an event occurs. However, this is not a limitation but is provided by way of an example, and a pixel to which filtering is applied may be determined based on a design, according to an exemplary embodiment.

Figure 13:
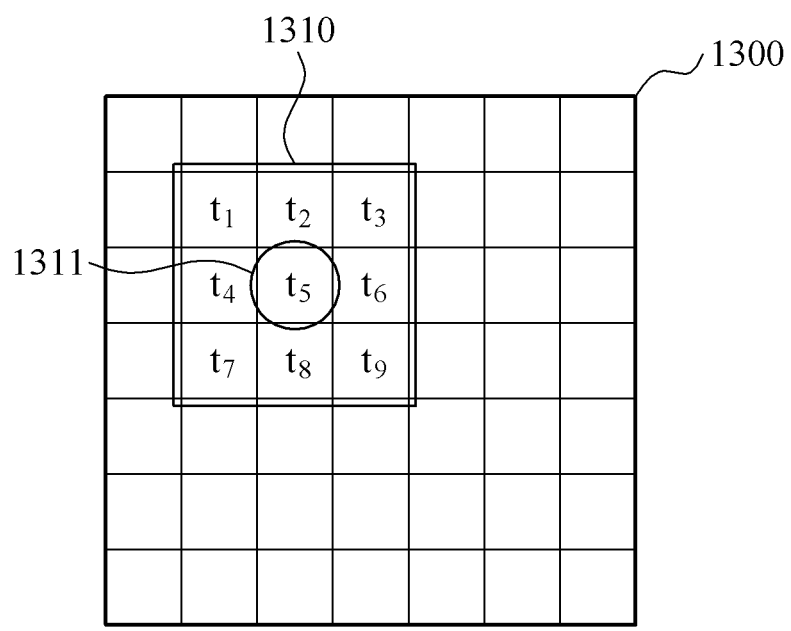
FIG. 13 is a view illustrating a first filter for performing time filtering of a pixel according to an exemplary embodiment.

FIG. 13 is a view illustrating a first filter for performing time filtering of a pixel according to an exemplary embodiment.

The first filter 1310 of FIG. 13 may have, for example, the shape of a filter such as the one described above with reference to FIG. 11; however, this is not a limitation but is provided by way of an example only. Accordingly, the first filter 1310 may have the shape such as the one described above with reference to FIG. 12, or various other sizes and shapes.

In FIG. 13, the first filter 1310 may perform first filtering on an element (for example, a timestamp) of a pixel 1311 in which an event occurs. The first filtering may indicate time-filtering including calculating time difference information for each pixel and performing filtering on a pixel determined as noise based on the calculated time difference information. For example, a pixel in which an event signal is generated a long time ago (for example, a pixel corresponding to a great sum of time differences between the pixel and neighboring pixels) is highly likely to be a noise pixel and accordingly, a pixel with large time difference information in comparison to the neighboring pixels may be filtered as noise through the first filtering.

In FIG. 13, when a timestamp of the pixel 1311 is assumed as $t_5$, timestamps of neighboring pixels may be represented by $t_1$, $t_2$, $t_3$, $t_4$, $t_6$, $t_7$, $t_8$, and $t_9$. The processor may calculate a time difference between the pixel 1311 and each of the neighboring pixels. For example, time differences between the pixel 1311 and the neighboring pixels may be calculated as $t_5-t_1$, $t_5-t_2$, $t_5-t_3$, $t_5-t_4$, $t_5-t_6$, $t_5-t_7$, $t_5-t_8$, and $t_5-t_9$, respectively.

The processor may then calculate a sum of the time differences. For example, in FIG. 13, a sum of the time differences may be calculated as a value of "$8 \times t_5-t_1-t_2-t_3-t_4-t_6-t_7-t_8-t_9$."

As described above, for example in operation 1041 of FIG. 10, the processor may calculate a time difference between the pixel 1311 and a neighboring pixel, by performing first filtering on each of the pixels in an event frame 1300. The first filtering may be performed on only a pixel in which an event occurs (for example, pixels in which the event signal 810 of FIG. 8 satisfying the predetermined time range, is generated). However, this is not a limitation but is provided by way of an example, and a pixel on which the first filtering is to be performed may be determined based on a design, according to an exemplary embodiment.

When the sum of the time differences (for example, time difference information) is less than a difference threshold, the processor may determine that the detected event is normal, and may maintain the pixel 1311. In contrast, when the time difference information is equal to or greater than the difference threshold, the processor may determine the pixel 1311 is noise, and may remove the pixel 1311.

Figure 14:
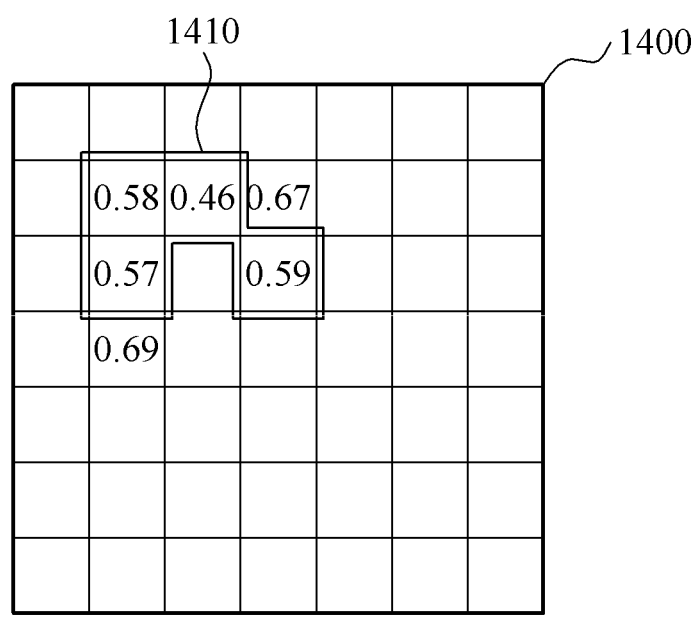
FIG. 14 is a view illustrating an event frame representing time difference information according to an exemplary embodiment.

FIG. 14 is a view illustrating an event frame representing time difference information calculated for the event frame according to an exemplary embodiment.

As described above, for example in operation 1042 of FIG. 10, the processor may store a sum of the time differences calculated in operation 1041 as time difference information of the pixel in which the event occurs. For example, the processor may store, as time difference information of the pixel 1311, the sum of time differences between the pixel 1311 and the neighboring pixels (for example, the value of "$8 \times t_5-t_1-t_2-t_3-t_4-t_6-t_7-t_8-t_9$"). The processor may calculate time difference information for each of the pixels in which an event occurs, and may store the time difference information in the event frame 1400 of FIG. 14.

For example, as shown in FIG. 14, time difference information may be calculated for pixels in which an event occurs, based on time information stored in the event frame such as the event frame 800 shown in FIG. 8. In the event frame 800, a pixel in which a timestamp is not represented may be assumed to have a timestamp of "0," however, this is not a limitation but is provided by way of an example. For example, for a pixel in which an event does not occur in a current event frame, a timestamp corresponding to a time at which an event occurs in a previous event frame may be stored.

For example, time difference information of a pixel located at (2, 2) in the event frame 800 may be calculated as "$8 \times 0.1-0.11-0.11=0.58$."

Additionally, the processor may perform first filtering on pixels in which an event occurs, based on the calculated time difference information. As described above, for example in operation 950 of FIG. 9, the processor may select pixels 1410 corresponding to a predetermined threshold time difference range. The processor may select pixels 1410 having a time difference level that is less than a slowest threshold level and that is greater than a fastest threshold level. The processor may remove, as noise, a pixel having a time difference level that is equal to or greater than the slowest threshold level and that is equal to or less than the fastest threshold level.

In FIG. 14, in a threshold time difference range, a slowest threshold level and a fastest threshold level may be assumed as "0.6" and "0.4," respectively. The pixels 1410 corresponding to the predetermined threshold time difference range may have time difference levels of "0.58," "0.46," "0.57," and "0.59." In FIG. 14, pixels with time difference levels 0.67 and 0.69 are removed as noise.

Pixels 1410 corresponding to finally selected event signals may correspond to an object that moves quickly, or a portion of the object that moves quickly. As described above, an apparatus for detecting a movement of an object based on an event may detect a high-speed movement of an object by calculating time difference information of a pixel in which an event occurs, in response to a change in light. Accordingly, it is possible to greatly reduce an amount of calculation that needs to be performed.

Figure 15:
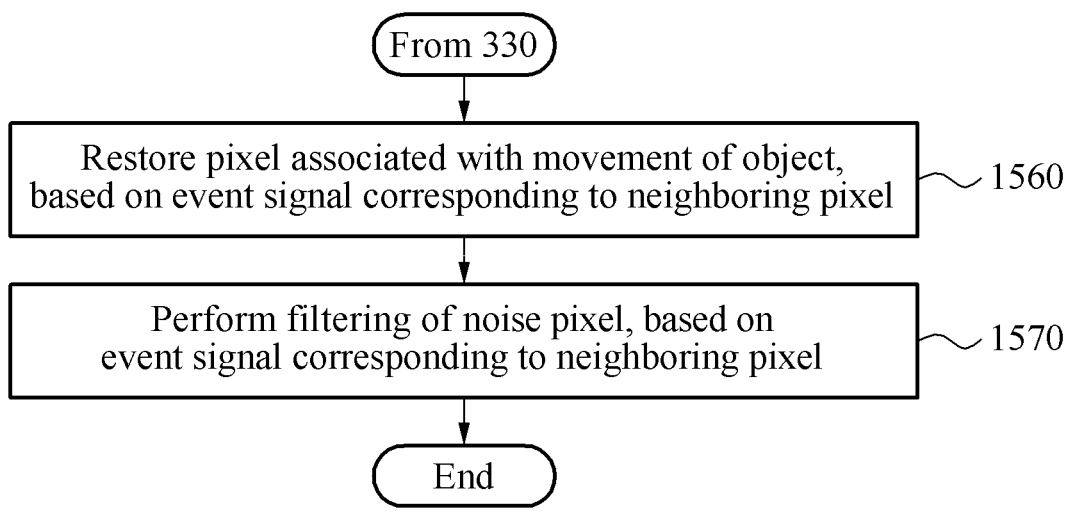
FIG. 15 is a flowchart illustrating an operation of restoring a pixel associated with a movement of an object and of performing filtering of a noise pixel according to an exemplary embodiment.

FIG. 15 is a flowchart illustrating an operation of restoring a pixel associated with a movement of an object and of performing filtering of a noise pixel according to an exemplary embodiment.

Referring to FIG. 15, in operation 1560, the processor may restore a pixel associated with a movement of an object, based on an event signal corresponding to a neighboring pixel. For example, the processor may restore a pixel associated with a movement of an object, based on an event signal corresponding to at least one neighboring pixel surrounding each of the plurality of pixels. The processor may restore an element of a pixel corresponding to an event signal that is not detected due to an error although the event signal should have been detected.

In operation 1570, the processor may perform filtering of a noise pixel, based on an event signal corresponding to a neighboring pixel. For example, the processor may perform filtering of a pixel in which an event occurs, based on an event signal corresponding to at least one neighboring pixel surrounding the pixel. In this example, the processor may perform filtering of a pixel corresponding to an event signal that is detected due to an error although the event signal should not have been detected. The noise pixel may be, for example, a pixel corresponding to an event signal detected due to an error.

Figure 16:
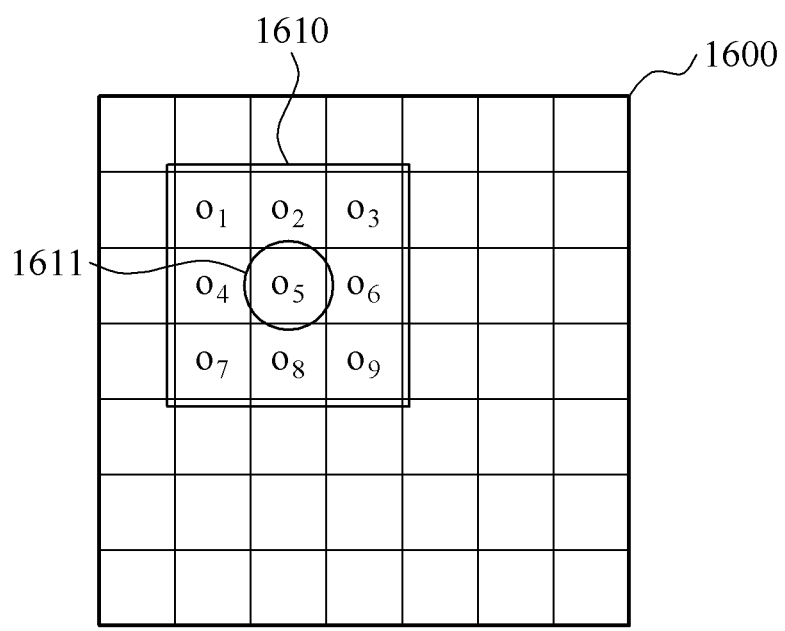
FIG. 16 is a view illustrating a second filter for performing spatial filtering of a pixel according to an exemplary embodiment.

FIG. 16 is a view illustrating a second filter 1610 for performing spatial filtering of a pixel according to an exemplary embodiment.

The second filter 1610 may be used, for example, to perform operations such as the ones described above with reference to operations 1560 and 1570 of FIG. 15. The second filter 1610 may be used to perform spatial filtering of a noise pixel and of restoring a missed pixel. The second filter 1610 may have, for example, the shape of FIG. 11; however, this is not a limitation but is provided by way of an example only. For example, the second filter 1610 may have various other shapes and sizes.

Second filtering may indicate spatial filtering of a pixel based on an output sum of neighboring event signals. For example, when the output sum of neighboring event signals is within a predetermined spatial filter range, the second filtering may refer to spatial filtering of restoring corresponding pixels. In this example, an event that is not detected due to an error may be restored through the second filtering and accordingly, event signals in an event map may be continuously spatially detected.

Additionally, when the output sum of neighboring event signals is beyond the predetermined spatial filter range, the second filtering may refer to spatial filtering of removing corresponding pixels as noise.

However, this is not a limitation but is provided by way of an example, and the second filtering may be performed both to restore a pixel and to remove noise, based on the predetermined spatial filter range, according to a design, according to an exemplary embodiment.

For example, the second filter 1610 may be a 3×3, as shown in FIG. 16. In an exemplary embodiment, an output sum of event signals in the second filter 1610 with respect to an arbitrary pixel 1611 may be represented as "$O_1+O_2+O_3+O_4+O_5+O_6+O_7+O_8+O_9$." Each of $O_1$ through $O_9$ denotes an output value of an event signal. In an exemplary embodiment, "1" corresponds to an ON event, and "−1" corresponds to an OFF event and may be represented as output values of event signals.

The processor may perform second filtering by applying the second filter 1610 to pixels in an event frame 1600 e.g., to all pixels in the event frame 1600.

Figure 17:
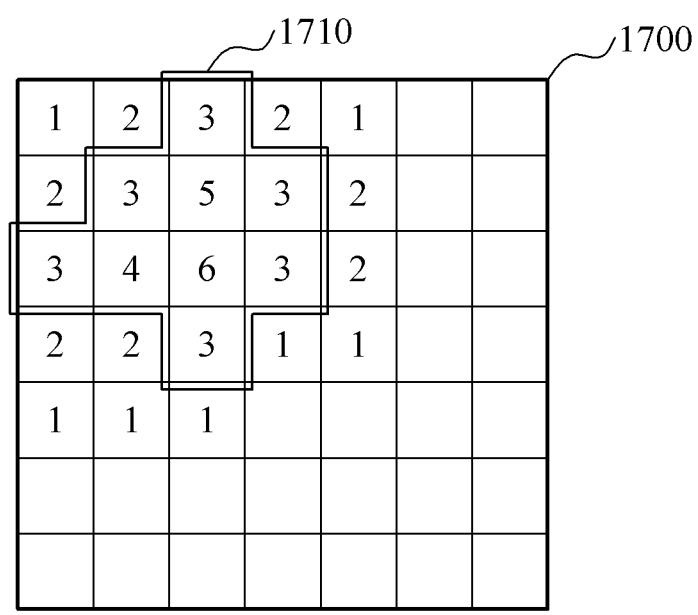
FIG. 17 is a view illustrating a result obtained by applying filtering using the second filter according to an exemplary embodiment.

FIG. 17 is a view illustrating a result obtained by applying filtering using the second filter according to an exemplary embodiment.

FIG. 17 illustrates a result of second filtering performed by the second filter such as the second filter 1610 configured to perform both: restore a pixel and to remove noise. As described above in operations 1560 and 1570 of FIG. 15 according to an exemplary embodiment, the processor may restore a pixel associated with a movement of an object, and may remove a noise pixel by using the second filter 1610. By applying the second filter 1610 to an event frame 1700, a pixel associated with a movement of an object may be restored, and a noise pixel may be removed.

The processor may apply the second filter such as the second filter 1610 to an event frame such as the event frame 800 of FIG. 8. Second filtering of an event signal value of each of pixels in the event frame 800 may be performed by the second filter 1610. The processor may perform second filtering of the pixels in the event frame 800, e.g., of all pixels in the event frame.

Referring to FIG. 8, event signals may be output from two pixels adjacent to a pixel located at (2, 2) in the event frame 800 (for example, a pixel located at (3, 2) and a pixel located at (2, 3)). The processor may calculate an output sum of neighboring event signals for the pixel located at (2, 2) as a value of "1+1+1=3" indicating that three event signals are output based on the pixel located at (2, 2) among 3×3 pixels. In FIG. 17, a portion in which an output sum of neighboring event signals is not represented may have a result value of "0."

A result obtained by the processor applying the second filter 1610 to the event frame 800 is represented as the event frame 1700. The processor may apply a predetermined spatial filter range from the result.

In an exemplary embodiment, the predetermined spatial filter range is described as a lower threshold (hereinafter, referred to as a "threshold"). For example, when a result obtained by applying a second filter to an arbitrary pixel is greater than the threshold, the processor may restore a corresponding pixel as a pixel associated with a movement of an object. In contrast, when the result is equal to or less than the threshold, the processor may remove a corresponding pixel as a noise pixel. However, this is not a limitation but an example to the above-described predetermined spatial filter range, and the predetermined spatial filter range may have an upper threshold and a lower threshold, based on a design, according to an exemplary embodiment.

In an exemplary embodiment, event signals may be output from pixels located at (2, 2), (2, 3), (2, 4), (3, 2), (3, 4), and (4, 2) in the event frame 800. The processor may select pixels 1710, each having a value exceeding the threshold, from the event frame 1700. The event frame 1700 may represent a value obtained by applying the second filter 1610 to the event frame 800 (shown in FIG. 8). The processor may restore a pixel in which an event signal is not detected as a pixel from which an event signal is output, among the pixels 1710. In FIG. 17, the threshold may be, for example, a value of "2," however, there is not a limitation but is provided by way of an example only. The threshold may be changed based on a design, according to an exemplary embodiment.

In the event frame 1700, the processor may restore pixels located at (1, 3), (3, 1), (3, 3), and (4, 3) as pixels associated with a movement of an object. For example, in each of the pixels located at (1, 3), (3, 1), (3, 3), and (4, 3), an output sum of neighboring event signals may exceed the threshold.

In another exemplary embodiment, the processor may remove, as noise pixels, pixels, each having a value equal to or less than the threshold, from the event frame 1700. The event frame 1700 may represent a value obtained by applying the second filter 1610 to the event frame 800 (shown in FIG. 8).

The processor may remove, as a noise pixel, a pixel located at (4, 2) from the event frame 1700. For example, in the pixel located at (4, 2), an output sum of neighboring event signals may be equal to or less than the threshold.

Figure 18A:
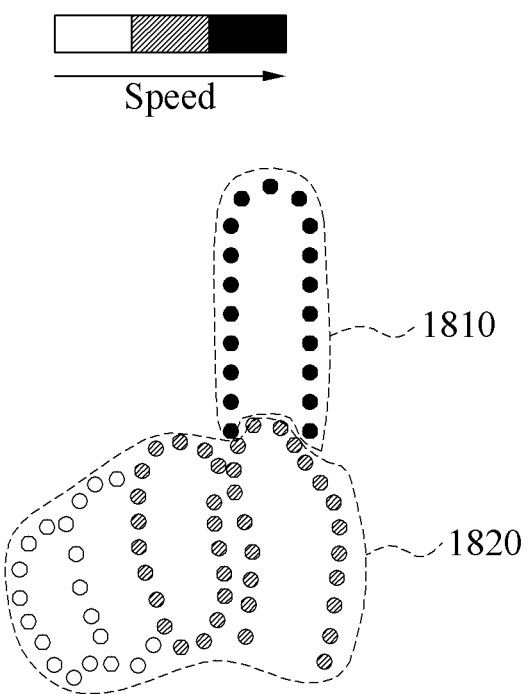
FIGS. 18A through 18C are views illustrating an event frame representing calculated time difference information according to an exemplary embodiment.
Figure 18B:
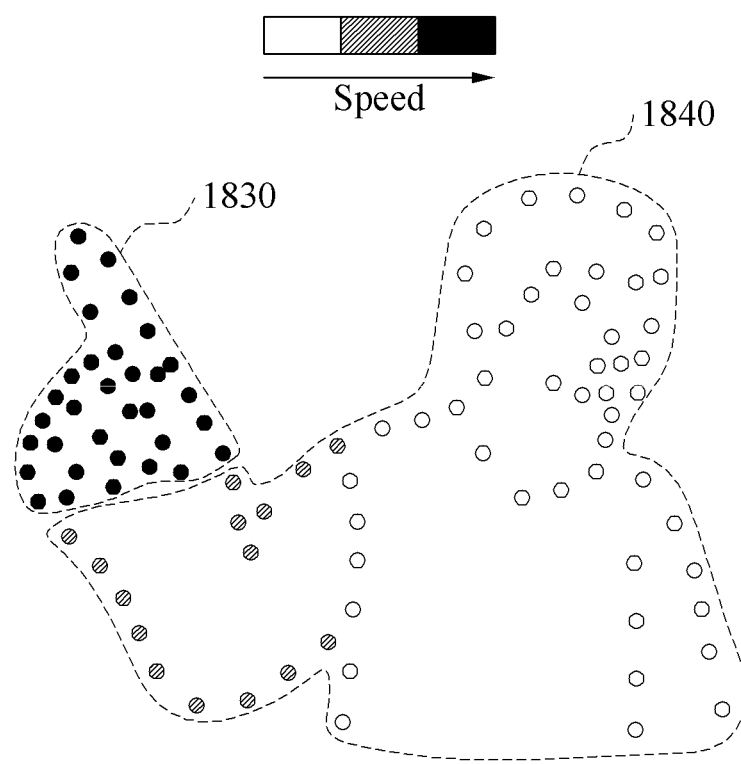
Figure 18C:
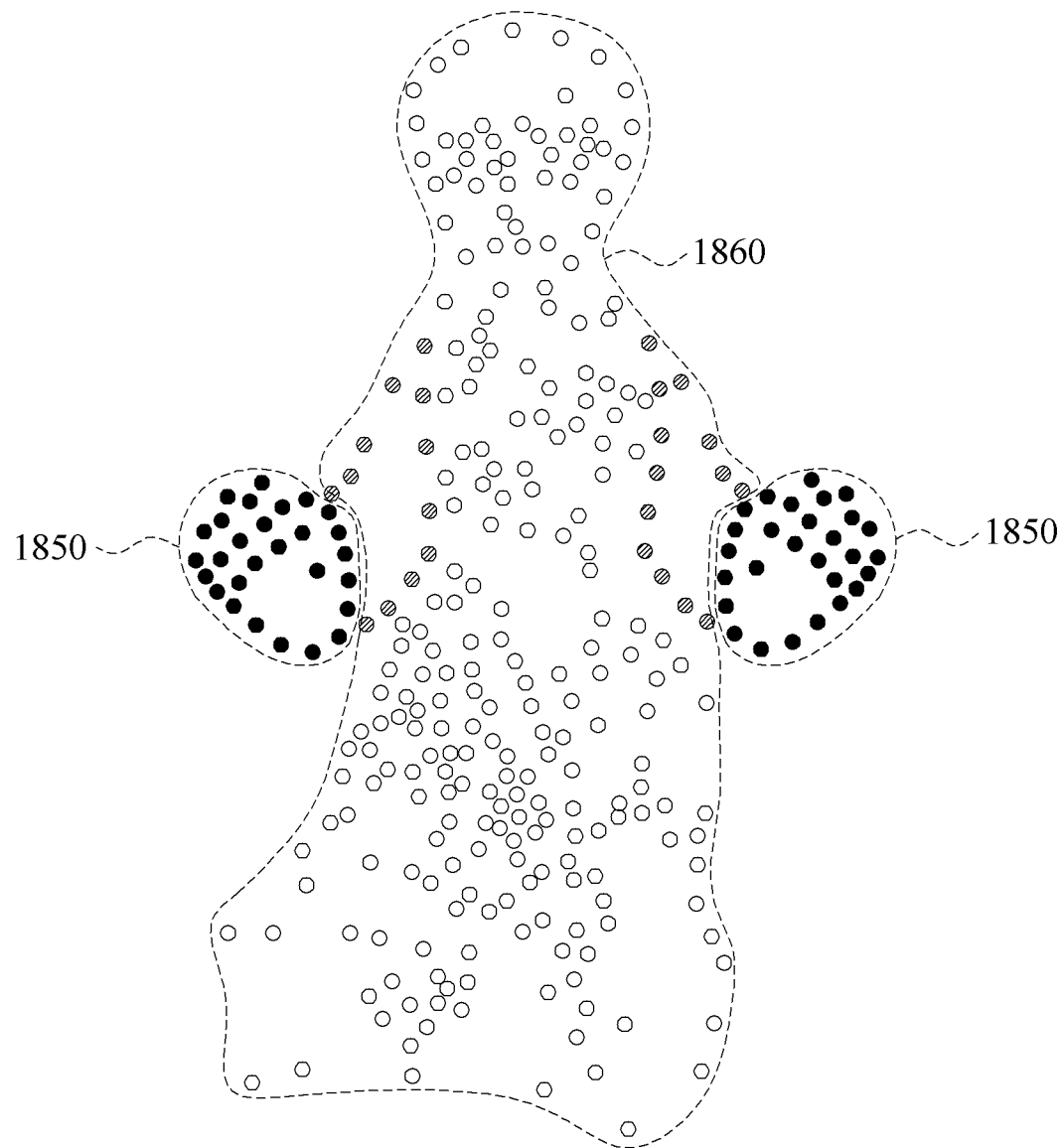

FIGS. 18A through 18C are views illustrating an event frame representing calculated time difference information according to an exemplary embodiment.

FIGS. 18A through 18C visually illustrate event frames including time difference information calculated for each pixel, for example as described above in FIG. 14. In FIGS. 18A through 18C, a white dot represents a pixel corresponding to a low speed, a gray dot represents a pixel corresponding to a medium speed, and a black dot represents a pixel corresponding to a high speed. For example, each of pixels in the event frame 1400 of FIG. 14 may be visualized based on a time difference level stored in each of the pixels, as shown in FIGS. 18A through 18C, according to an exemplary embodiment. In FIGS. 18A through 18C, the time difference level may be divided into three sections, and visualized, however, this is not a limitation but is provided by way of an example only. Accordingly, the time difference level may be divided into a plurality of sections, and may be visualized, according to an exemplary embodiment.

When time difference information calculated for each of pixels forming an event frame as described above with reference to FIGS. 1 through 17 is visualized, a fast moving portion of an object, and a slow moving portion of the object may be identified.

FIG. 18A is a view illustrating a visualized result obtained by detecting the hand movement such as hand movement 210 of FIG. 2 using an apparatus for detecting a movement of an object based on an event, according to an exemplary embodiment. In FIG. 18A, an index finger area 1810 is represented by black dots due to a fast movement of an index finger, and a palm area 1820 is represented by a relatively large number of white dots due to a slow movement of a palm.

FIG. 18B is a view illustrating a visualized result obtained by detecting a movement of a hand in a human body using an apparatus for detecting a movement of an object based on an event, according to an exemplary embodiment. In FIG. 18B, a hand area 1830 is represented by black dots due to a fast movement of a hand, and an area 1840 other than the hand is represented by a relatively large number of white dots due to a slow movement.

FIG. 18C is a view illustrating a visualized result obtained by detecting movements of both hands in a human body using an apparatus for detecting a movement of an object based on an event, according to an exemplary embodiment. In FIG. 18C, both hand areas 1850 are represented by black dots due to fast movements of both hands, and an area 1860 other than the hands is represented by a relatively large number of white dots due to a slow movement.

Typically, a moving speed may increase from a central part to a terminal part in a human body. For example, a finger of FIG. 18A, a hand of FIG. 18B, and both hands of FIG. 18C may move at a highest speed with respect to the other portions of the human body. As described above, according to an exemplary embodiment, the apparatus for detecting a movement of an object based on an event may extract only a portion moving at a high speed from an arbitrary object that is moving.

However, a method and apparatus for detecting a movement of an object based on an event may classify time difference levels of all types of objects and all portions of each of the objects and thus, it is possible to quickly and accurately detect a movement, according to an exemplary embodiment.

Figure 19:
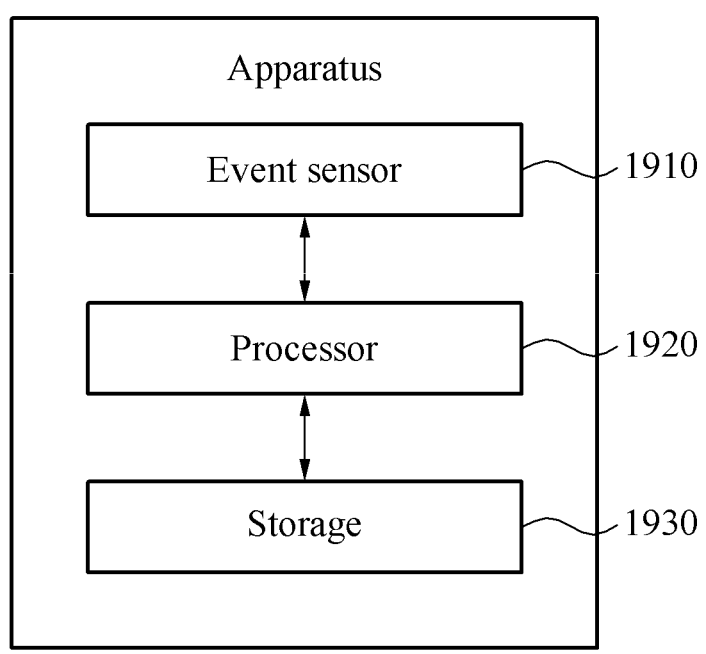
FIG. 19 is a block diagram illustrating an apparatus for detecting a movement of an object based on an event according to an exemplary embodiment.

FIG. 19 is a block diagram illustrating an apparatus for detecting a movement of an object based on an event according to an exemplary embodiment.

Referring to FIG. 19, the apparatus 1900 may include an event sensor 1910, a processor 1920, and a storage 1930 e.g., a memory. The processor includes hardware or a combination of hardware and software. The event sensor is also a hardware or a combination of hardware and software.

The event sensor 1910 may detect an event that is associated with the movement of the object and that occurs in each of a plurality of pixels included in image data, and may output at least one event signal. The above-description of FIGS. 1 through 18C is also applicable to an operation of the event sensor 1910, according to an exemplary embodiment, and accordingly, will not be repeated here.

The processor 1920 may store time information corresponding to a pixel in which the event occurs, in response to the at least one event signal being output, and may extract an event signal including time information corresponding to a predetermined time range from among the at least one event signal. The above-description of FIGS. 1 through 18C is also applicable to an operation of the processor 1920, according to an exemplary embodiment, and accordingly, will not be repeated here.

The storage 1930 may store the event signal output by the event sensor 1910, time information, a time difference calculated by the processor 1920, time difference information, and the like. Additionally, the storage 1930 may include commands to allow the operations and methods of FIGS. 1 through 18C to be performed, according to an exemplary embodiment. The commands may be executed by the processor 1920.

The apparatus 1900 may detect a high-speed movement of an object (for example, a hand motion). According to an exemplary embodiment, by performing filtering of spatio-temporal image information in a time and a space, a high-speed movement of an object may be detected. In addition, only an event occurring in response to a change in light may be detected and calculated. Accordingly, in an exemplary embodiment, it is possible to easily determine a complex high-speed hand motion based on a simple calculation and a small amount of calculations. Thus, it is possible to implement a user interface (UI) based on a user's hand motion by detecting a movement of an object with a fast hand motion.

The elements or components described herein may be implemented using hardware components, software components, or a combination thereof. For example, the hardware components may include microphones, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device may also access, store, manipulate, process, and create data in response to execution of the software. For purpose of simplicity, the description of a processing device is used as a singular; however, one skilled in the art will readily appreciate that a processing device may include multiple processing elements or components and multiple types of processing elements or components. For example, a processing device may include multiple processors or a processor and a controller. In addition, different processing configurations are possible, such as parallel processors.

The software may include a computer program, a piece of code, an instruction, or some combination thereof, to independently or collectively instruct or configure the processing device to operate as desired. Software and data may be embodied permanently or temporarily in any type of a machine, a component, a physical or virtual equipment, a computer storage medium or a device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The above-described exemplary embodiments may be recorded in non-transitory computer-readable media including program instructions to implement various operations which may be performed by a computer. The media may also include, alone or in combination with the program instructions, data files, data structures, and the like. The program instructions recorded on the media may be those specially designed and constructed for the purposes of the exemplary embodiments, or they may be of the well-known type and available to those having skill in the computer software arts. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as code produced by a compiler, and files containing higher level code that may be executed by the computer using an interpreter. The described hardware devices may be configured to act as one or more software modules in order to perform the operations of the above-described exemplary embodiments, or vice versa.

Although a few exemplary embodiments have been shown and described, the present inventive concept is not limited thereto. Instead, it will be appreciated by those skilled in the art that changes may be made to these exemplary embodiments without departing from the principles and spirit of the disclosure, the scope of which is defined by the following claims and their equivalents.

What is claimed is:

1. A method of detecting a movement, the method comprising:
    detecting, by a sensor, a first event corresponding to the movement of an object and occurring in each of a plurality of pixels in image data;
    outputting, by the sensor, a plurality of event signals, based on the first event that is detected;
    storing, by a memory, time information at which the first event that is detected occurs in each of the plurality of pixels, in response to the plurality of event signals being outputted;
    extracting, by a processor, a signal from one or more first pixels of which the time information that is stored is in a predetermined time range, from the plurality of pixels, the signal that is extracted corresponding to a first event signal that is extracted from the plurality of event signals;
    determining, by the processor, time difference information of each of the one or more first pixels, based on a time difference between the time information that is stored of a first pixel, among the one or more first pixels, and each of the time information that is stored of at least one neighboring pixel surrounding the first pixel; and
    determining, by the processor, a sum of the determined time difference between the time information that is stored of the first pixel and each of the time information that is stored of the at least one neighboring pixel, as the time difference information.

2. The method of claim 1, further comprising:
    identifying, by the processor, a second event signal corresponding to a portion of the object, among the plurality of event signals that is outputted.

3. The method of claim 1, further comprising:
    selecting, by the processor, a second event signal corresponding to another predetermined event from the plurality of event signals that is outputted.

4. The method of claim 1, further comprising:
    determining, by the processor, whether the time difference information that is determined of each of the one or more first pixels is in a predetermined threshold time difference range; and
    selecting, by the processor, at least one second pixel of which the time difference information that is determined is in the predetermined threshold time difference range, from the one or more first pixels.

5. The method of claim 1, further comprising:
    restoring, by the processor, a pixel corresponding to the movement of the object, among the plurality of pixels, based on a second event signal corresponding to each of one or more neighboring pixels surrounding each of the plurality of pixels.

6. The method of claim 1, further comprising:
performing, by the processor, filtering of a pixel among the plurality of pixels, based on a second event signal corresponding to each of one or more neighboring pixels surrounding each of the plurality of pixels.

7. The method of claim 1, further comprising:
determining, by the processor, the predetermined time range, based on one of the time information of a last event signal in a predetermined time window and average time information of the plurality of event signals in the predetermined time window.

8. The method of claim 1, further comprising:
adjusting, by the processor, the predetermined time range, based on the time difference information that is determined.

9. An apparatus for detecting a movement, the apparatus comprising:
a sensor configured to detect a first event corresponding to the movement of an object and occurring in each of a plurality of pixels in image data, and output a plurality of event signals, based on the first event that is detected;
a memory configured to store time information at which the first event that is detected occurs in each of the plurality of pixels, in response to the plurality of event signals being outputted; and
a processor configured to:
extract a signal from one or more first pixels of which the time information that is stored is in a predetermined time range, from the plurality of pixels, the signal that is extracted corresponding to a first event signal that is extracted from the plurality of event signals;
determine time difference information of each of the one or more first pixels, based on a time difference between the time information that is stored of a first pixel, among the one or more first pixels, and each of the time information that is stored of at least one neighboring pixel surrounding the first pixel; and
determine a sum of the determined time difference between the time information that is stored of die first pixel and each of the time information that is stored of the at least one neighboring pixel, as the time difference information.

10. The apparatus of claim 9, wherein the processor is further configured to identify a second event signal corresponding to a portion of the object, among the outputted plurality of event signals.

11. The apparatus of claim 9, wherein the processor is further configured to select a second event signal corresponding to another predetermined event from the outputted plurality of event signals.

12. The apparatus of claim 9, wherein the processor is further configured to:
determine whether the determined time difference information of each of the one or more first pixels is in a predetermined threshold time difference range; and
select at least one second pixel of which the determined time difference information is in the predetermined threshold time difference range, from the one or more first pixels.

13. The apparatus of claim 9, wherein the processor is further configured to restore a pixel corresponding to the movement of the object, among the plurality of pixels, based on a second event signal corresponding to each of one or more neighboring pixels surrounding each of the plurality of pixels.

14. The apparatus of claim 9, wherein the processor is further configured to perform filtering of a pixel among the plurality of pixels, based on a second event signal corresponding to each of one or more neighboring pixels surrounding each of the plurality of pixels.

* * * * *